United States Patent [19]
Ward et al.

[11] Patent Number: 5,585,859
[45] Date of Patent: Dec. 17, 1996

[54] SYSTEM FOR REDUCING BEAT TYPE IMPAIRMENTS IN A TV SIGNAL

[75] Inventors: Rabab K. Ward, Vancouver; Pingnan Shi, Richmond; Qiaobing Xie, Vancouver, all of Canada

[73] Assignee: The University of British Columbia, Vancouver, Canada

[21] Appl. No.: 245,134

[22] Filed: May 17, 1994

[51] Int. Cl.$^6$ .............................. H04N 5/217; H04N 5/21
[52] U.S. Cl. ............................................... 348/619; 348/607
[58] Field of Search ........................... 348/606, 607 OR, 348/619 R, 620, 621; 455/296, 67.3; 375/5/217, 5/21 OR

[56] References Cited

U.S. PATENT DOCUMENTS

| | | | |
|---|---|---|---|
| 4,800,511 | 1/1989 | Tanaka | 348/619 |
| 4,807,034 | 2/1989 | Takeuchi et al. | 348/620 |
| 5,027,209 | 6/1991 | Nishimura et al. | 348/619 |
| 5,099,329 | 3/1992 | Oyama et al. | 348/607 |
| 5,253,045 | 10/1993 | Lippel | 348/606 |
| 5,311,314 | 5/1994 | Gutsmann | 348/607 |
| 5,323,239 | 6/1994 | Ward et al. | 348/607 |
| 5,412,432 | 5/1995 | Hong | 348/606 |

FOREIGN PATENT DOCUMENTS

| | | | |
|---|---|---|---|
| 404237 | 12/1990 | European Pat. Off. | H04N 5/21 |
| 496573 | 7/1992 | United Kingdom | H04N 5/217 |

*Primary Examiner*—Victor R. Kostak
*Assistant Examiner*—John W. Miller
*Attorney, Agent, or Firm*—C. A. Rowley

[57] ABSTRACT

The system for reducing composite beat, composite second order beat and thermal (snow) noise impairments in a television system digitizes individual frames to apply digitized a grey scale values ($v_{(i,j)}$) to the pixels in the frames and then applying a spatial filter to a block of pixels including the then current pixel being processed to determine the pixel ($P_{(min)}$) with the minimum grey scale value ($v_{(min)}$) and the pixel ($P_{(max)}$) in the block with the maximum grey scale value ($v_{(min)}$). $V_{(max)}-v_{min}$ is compared with a threshold value ($v_{(T)}$) and if $v_{(max)}-v_{min}>v_{(T)}$, the value ($v_{(i,j)}$) of the pixel being processed remains unchanged, but if $v_{(max)}-v_{(min)} \ngtr v_{(T)}$, a value ($v_{(av.)}$) equal to the weighted average value of pixels in the block is used as the grey scale value $v_{(R-i,j)}$ for the pixel being processed. The block preferably, will be composed of a number of adjacent pixels in a row or a number of adjacent pixels in a column or both processed simultaneously or preferably in sequence i.e. the pixels processed along the rows and then along the columns with the values assigned to the pixels when processing along the rows used as the initial values for the pixels when processing along the columns.

In more preferred cases, a plurality of frames are each subject to static filtering and then the adjacent frames in the sequence are subject to time filtering (provided motion is not detected) to provide a better average value $vZ_{(mean)}$ for the processed pixel in the specific frame being processed.

15 Claims, 5 Drawing Sheets

1

SYSTEM FOR REDUCING BEAT TYPE IMPAIRMENTS IN A TV SIGNAL

FIELD OF THE INVENTION

The present invention relates to a system for reducing composite beat noises or impariments in TV signals more particularly present invention relates to a system for reduction of composite triple beat, composites second order beat and thermal noise impairments in cable television pictures.

BACKGROUND OF THE PRESENT INVENTION

A system for correction for composite triple beat impairments in a television signal has been described in co-pending U.S. application Ser. No. 08/059387 filed May 11, 1993, Ward et al. The rationale behind cancelling the composite triple beat (CTB) impairment is based on the concept that over a small region of any line of picture a CTB may be approximated as a constant luminance signal. Thus the effect of a CTB impairment on a small segment of an image may be modeled as a change in DC luminance by an unknown constant which if it can be discovered and filtered out should reduce the CTB. In this technique, the digitalized image is divided into vertical stripes or subpictures and the average intensity of the signal in each line of the subpicture is determined. These average intensities are then filtered by a sliding average window, a length of approximately three to five pixels. The filtered value of the average intensity is then assumed to be the correct DC level of the corresponding line of the subpicture. The noise reduction may also be further reduced by applying a multi-frame, CTB removal scheme wherein the average of the DC level is in a given subpicture is based on the average of the same subpicture in a number of consecutive frames with a sequence.

The above method with a minor modification is also capable of measuring the carrier to noise ratio of a CTB impaired picture within reasonable accuracy and to do so without being intrusive of the picture being transmitted or received.

The computational requirements of the above described system are quite high making it difficult to provide a practical system that may be used in real time to correct the TV image.

To reduce thermal (snow) noise inter frame averaging has been used. Normally to be effective e.g. to achieve a 10 decibel reduction, 10 frames are required. However, for practical purposes this poses a difficulty in that the equipment required to buffer 10 frames adds significantly to the cost.

It will be apparent that in order to reduce significantly CTB, composite second order beat (CSO) and thermal noise requires significant computation on hardware including a number of buffers etc. It has not found practical application in competitive domestic cable television systems.

U.S. Pat. No. 5,099,329 dated Mar. 24, 1992 assigned to Graphic Communication Tech of Japan describes a technique wherein the grey scale value of each pixel of a current frame is replaced with a corresponding one of the previous frame unless the pixel is part of a moving object. To determine whether or not a pixel is part of a moving object, the absolute difference between the values for pixel in the two frames is compared with a preset threshold and if greater the pixel is considered to be part of a moving object.

European patent application 404,237 filed on Dec. 27, 1990 by Phillips describes a noise suppression method for digital signals obtained by sampling an analogue TV signal and obtaining the difference between two successive sample values. The obtained difference is compared with a reference value and when the obtained difference is less the referenced, the second sample value is replaced by the preceding value.

In yet another U.S. Pat. No 4,807,034 filed Feb. 21, 1989, issued to Toshiba employs a noise reduction circuit that causes a subtracting circuit to subtract a delayed video signal (supplied from the field memory with one field time delay) from the video signal and allows the resultant signal to be output as the field difference signal. A noise component included in the video signal is extracted by a noise extracting circuit in accordance with the field difference signal and is output to the subtracting circuit. A comparing circuit compares the noise component with a pre-determined reference value to determine whether the video signal represents a motion or motionless picture and if it is a motionless picture, the memory control circuit uses the video signal supplied from the field memory. If motion is detected then the then current value is used.

The principals of the above three patents are all basically the same in that all rely on replacing the value of each pixel in a digitized picture with the value of a corresponding pixel. The main difference between the various systems is in the location of the corresponding pixel, the value of which is to be used. In U.S. Pat. Nos. 5,099,329 and 4,807,034, the location of the corresponding pixel is in the previous frame, for application Ser. No. 404,237 the corresponding pixel is in the adjacent spacial location of the same frame. All use essentially the same technique to determine motion or to detect edges. These systems reduce thermal noise only and have little if any effect on CTB or composite second order beat (CSO) impairments.

BRIEF DESCRIPTION TO THE INVENTION

It is an object of the present invention to provide a noise suppression system for reducing thermal noise, composite triple beat noise (CTB) and composite second order beat (CSO) noise using a simple system requiring little hardware and that may perform in Real Time.

Broadly, the present invention relates to a system for reducing impairments in real time from a television transmission comprising digitizing frames to produce digitized frames containing pixels each having their respective original grey scale intensity value (v) converted to a digitized value ($v_{(i,j)}$), processing said digitized frame for each pixel for which said impairments are to be reduced by applying spatial filter to a block of said pixels containing said pixel ($P_{(i,j)}$) then being processed by determining the pixel ($P_{max}$) in said block having the maximum grey scale intensity value ($v_{(max)}$) and the pixel ($P_{min}$) in said block having the minimum grey scale intensity value ($v_{(min)}$) and comparing $v_{(max)}$ minus $v_{(min)}$ to a threshold value ($v_{(T)}$), if $v_{(max)} - v_{(min)} > v_{(T)}$ the resultant value $v_{(R-i,j)}$ for the pixel $P_{(i,j)}$ being processed is said value ($v_{(i,j)}$) for the pixel being processed and if $v_{(max)} - v_{(min)} \not> v_{(T)}$ the resultant value $v_{(R-i,j)}$ for the pixel $P_{(i,j)}$ being processed is determined by finding the weighted average intensity value $v_{(av.)}$ of the pixels in the group after applying a minimum weighting value ($W_{(min)}$) to $v_{(max)}$ and to $v_{(min)}$ and using the weighted average value $v_{(av.)}$ to define the resultant intensity value $v_{(R-i,j)}$ for the pixel $P_{(i,j)}$ being processed, and reconstructing said frames to provide corrected frames using applied values $v_{(a-i,j)}$ derived from said resultant value $v_{(R-i,j)}$ as grey scale value for its respective pixel in said reconstructed frame.

Preferably, said minimum weighting value $W_{(min)}$ will be zero (0).

Preferably, said block will be defined by an odd number of adjacent pixels of between three to seven pixels (preferably five) along a row of pixels.

Preferably, said block will be defined by an odd number of adjacent pixels of between three and seven pixels (preferably five) along a column of pixels.

Preferably, said block for each said pixel being processed comprises a first block composed of an odd number of between three and seven of adjacent said pixels along a row of said pixels and a second block composed of an odd number of between three and seven of adjacent pixels along a column of said pixels and wherein said first blocks are first processed to determine said resultant values $v_{(R-i,j)}$ of pixels and said resultant values $v_{(R-i,j)}$ is used as grey scale values for their respective said pixels when said second blocks are subjected to said processing to determine a second weighted average $v_{(2av.)}$ and said second weighted average $v_{(2av.)}$ is used as said applied value of intensity $v_{(a-i,j)}$ of the pixel being processed or said resultant value $v_{(R-i,j)}$ is used as said applied value $v_{(a-i,j)}$ if $v_{(max)} - v_{(min)} > v_{(T)}$.

Preferably, said minimum weighting value will be zero (0) and the remaining pixels in said block are given equal weighting.

Preferably said system further comprises applying said processing to a plurality of said digitized frames in succession to provide a group of said frames, determining if movement is depicted in the pixel being processed between corresponding pixels in said frames in said group, if movement is detected, said previously found applied value $v_{(a-i,j)}$ of the pixel in the frame being processed will be retained and used to reconstruct said corrected frame, and if movement is not detected, a mean value $v_{(mean)}$ of said previously found values $v_{(a-i,j)}$ of corresponding pixels in said frames in said group will be used as the applied value $v_{(a-i,j)}$ to reconstruct said corrected frame.

Preferably the number of frames in each group will be four.

BRIEF DESCRIPTION OF THE DRAWINGS

Further features, objects and advantages will be evident for the following detailed description of the preferred embodiments of the present invention taken in conjunction with the accompanied drawings.

DESCRIPTION OF THE PREFERRED EMBODIMENTS

Before discussing the present invention in more detail, it is being made clear that when an applicant refers to the same pixel in different digitized frames, it is intended to mean the pixel in the same position in the frames being discussed.

The present invention relies on the relatively simple process consisting primarily of four steps. The first comprising grabbing a frame from a TV signal containing noise in line 10 and converting the frame into a digitized frame where each pixel of the frame is designated by an intensity value ($v_{(i,j)}$) corresponding to the intensity value in the same location on the grabbed frame. Thus, the first step is to frame grab and convert from analogue to digital as indicated by the box 12.

Next, each of the digitized frames from the analogue to digital converter is then individually processed in the signal frame of processing station or system as indicated at 14 using a spacial filter.

The spacial filter preferably comprises the following steps which are repeated for each pixel being processed. The pixel being processed is identified by the symbol (i,j).

For each of the pixels (i,j), the pixels on opposite sides thereof along a row are considered preferably five pixels, i.e. two preceding and two following pixels along the row so that this pixel being considered is in the centre of the group of block of pixels being considered.

Figure 1:
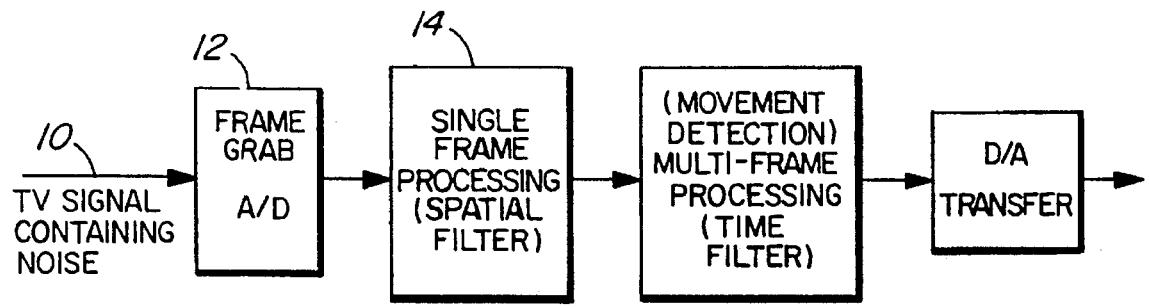
FIG. 1 is a schematic illustration of the process of the present invention.
Figure 2:
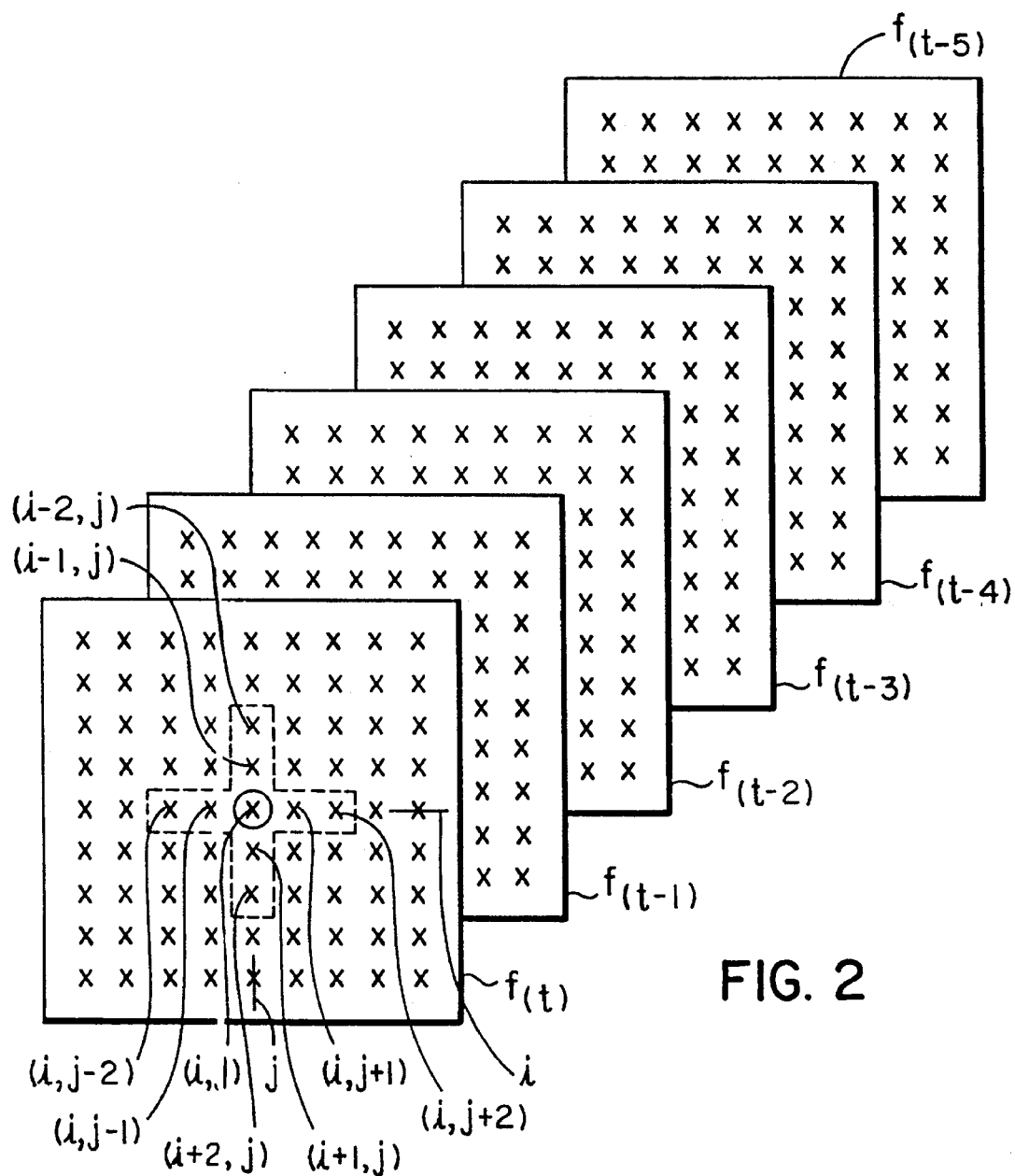
FIG. 2 is a schematic representative of a plurality of digital frames illustrating the manner in which the spacial and time filters are applied and a group of frames defined for the time filtering.

In the illustration FIG. 2, the pixels along row 4 are being considered and thus the particular pixel being considered processed is the pixel (i,j) contained within the circle and it, together with the previous two pixels along the row 4 i.e. (i,j−1) and (i,j−2) and the two next following or preceding along the row 4 (i,j+1) and (i,j+2). The number of pixels used along the rows when applying the spacial filter will preferably be 5 but another odd number of pixels such as 3 or 7 may be used. If too many are used the effectiveness of the filter is lost.

The intensity values for each of these pixels, i.e. $v_{(i,j-2)}$ to the $v_{(i,j+2)}$ are each determined and the pixel $P_{(max)}$ with the maximum value $v_{(max)}$ is determined. Similarly, the pixel $P_{(min)}$ having the minimum intensity $v_{(min)}$ is determined.

The intensity value $v_{(min)}$ for pixel $P_{(min)}$ is then subtracted from the intensity value $v_{(max)}$ for pixel $P_{(max)}$ and compared to a threshold value $v_{(T)}$, i.e., $v_{(max)} - v_{(min)} > v_{(T)}$. If the difference between $v_{(max)} - v_{(min)} > v_{(T)}$, no change is made to the intensity of the pixel (i,j) i.e. $v_{(i,j)}$ stays the same and is used as the resultant value $v_{R-i,j}$. However, if the threshold $v_{(T)}$ is not exceeded, the intensity of pixel (i,j) $v_{(i,j)}$ is determined using the weighted average intensity $v_{(av.)}$ of the pixels in the block. The weighting factors are preferably assigned to the pixels based on their grey scale values (v) with the weighting for the pixels having the values $v_{(max)}$ and $v_{(min)}$ being the lowest i.e. $P_{(max)}$ and $P_{(min)}$ have the lowest weighting which preferably will be set at zero (0) and in the preferred system the other pixels each will be assigned the same weighting factor i.e. the values $v_{(max)}$ and $v_{(min)}$ for $P_{max}$ and $P_{min}$ respectively are discarded and in the example being described wherein 5 pixels are being considered, the value v for each of the three pixels remaining are used to compute the average value $v_{(av.)}$ for the pixels and this value $v_{(av.)}$ is used as the resultant value $v_{(R-i,j)}$ for the pixel (i,j) as determined by processing along the row. The resultant value for the pixel (i,j) i.e. $v_{(R-i,j)}$ determined by application of the spacial filter 14 may be $v_{i,j}$ as defined by conversion from analogue to digital as above described if $v_{(T)}$ is not exceed, or if $v_{(T)}$ is exceeded the resultant value $v_{(R-i,j)}$ is $v_{(av.)}$.

It is possible to use the values $v_{R-i,j}$ as the applied values $v_{(a-i,j)}$ used to reconstruct the frame and provide a corrected frame, however the full correction of the frame will not normally be attained.

Preferably after the values $v_{(R-i,j)}$ have been determined for the pixels in the frame by processing as above described e.g. with the blocks consisting of adjacent pixels along the rows, the single frame processing station 14 repeats the same procedure as described above with respect to pixels e.g. pixel (i,j) by processing pixels along a column containing this pixel (i,j) namely along the column j which in the illustrated arrangement is column 6. The processing of the pixels along the columns uses as the value $v_{(R-i,j)}$ for the grey scale the value assigned to each pixel via the above system i.e. the defined value $v_{(R-i,j.)}$ is used as opposed to the values $v_{(i,j)}$ for the pixels when processing along the columns. In this case, the pixels (i−2,j), (i−1,j), (i,j), (i+1,j), (i+2,j) are processed and as above described to determine again $P_{max}$ and $P_{min}$, the intensity values $v_{(max)}$ and $v_{(min)}$ of these two pixels are again subtracted and compared with a threshold value $v_{(T)}$ which will normally be selected to be the same as the threshold value $v_{(T)}$ used when processing pixels along a row. Again if the threshold value $v_{(T)}$ is exceeded, nothing is changed i.e. the value $v_{(R-i,j)}$ is retained. However, if the threshold value $v_{(T)}$ is not exceeded then the values for $v_{(max)}$ and $v_{(min)}$ the values of the pixels are weighted preferably in the same manner as above described when processing along the rows and a second weighted average value $v_{(2av.)}$ of the pixels in the group is determined and used as the applied value $vZ_{(a-i,j)}$ for pixel (i,j) when constructing the corrected frame.

Preferably, the number of pixels in a group when processing along a column will be the same as when processing along a row.

It is preferred to process or apply the static filter to the pixels along the row separately from the application to the pixels along the column and to complete processing along the rows before commencing processing along the columns so that the assigned values attained by processing along the rows may be used as the initial values for the pixels when processing along the columns. However, if desired, and sufficient computing capacity is available, all of the pixels in the row and column to be processed for a given pixel may be considered and processed simultaneously e.g. first the row block for the pixel and then the column block for that pixel.

As above indicated the number of pixels in each block must be an odd number thus a block must contain at least 3 and generally will not exceed 7 pixels. If more than 7 pixels are used computations increase significantly, but the results tend to be less accurate. The most preferred number of pixels in a block is 5 and the block will be selected either from a row or from a column of pixels with the pixel being considered positioned at the mid-point of the block.

The threshold value $v_{(T)}$ cannot be set too high or it will still include edges of objects or the like, i.e. pixels wherein there is a very significant difference in intensity caused by genuine change in grey scale due to edges present in the pixel. Obviously if this is the case this represents a significant change and not a noise or a feature that should be corrected, i.e. the difference in signal is not noise related but is picture related and should be retained. For this reason, the value of the threshold $v_{(T)}$ is selected to be about 10% of the full scale for value $v_{(i,j)}$ which in normal circumstances is in the range of 0 to 255. Thus the value of the threshold $v_{(T)}$ will normally be under these circumstances approximately 20 and normally would not exceed about 35.

It will be apparent that a reconstructed corrected frame may be produced using the pixel values $v_{(a-i,j)}$ as determined after processing along the columns as above described to provide a better corrected frame than was available when reconstructing after row processing only. It is preferred to time filter these values to obtain after column processing to provide further correction before reconstructing the corrected frame as this produces a cleaner picture.

After the frame $f_{(t)}$ is processed, a time filter technique is applied to process the frame $f_{(t)}$ with a plurality of consecutive frames that have been already processed as above described. i.e. in FIG. 2, the frames $f_{(t)}$, $f_{(t-1)}$, $f_{(t-2)}$, $f_{(t-3)}$, $f_{(t-4)}$, $f_{(t-5)}$, and $f_{(t-6)}$ have been shown but generally only up to about 4 frames are processed, i.e. $f_{(t)}$, $f_{(t-1)}$, $f_{(t-2)}$ and $f_{(t-3)}$ would be used. The corresponding pixels in each of the frames are as above described the pixels in the same location in the frames, i.e. pixel (i,j) in frame $f_{(t)}$ would be depicted as $(i,j)_{(t)}$ and in the previous process frames would be designed by $(i,j)_{(t-1)}$, $(i,j)_{(t-2)}$, etc.

Before applying any time filter correction, it is first necessary to determine whether the pixel (i,j) designates a moving object. This is preferably done by determining whether the value of pixel $(i,j)_t$ minus the average of the equivalent pixels in the three previous frames is greater than the second threshold value $v_{(THE)}$ which will normally be set in the range of 5 to 20, preferably the threshold will have a value of 10. If the current pixel $(i,j)_t$ is greater than the average of the value for the preceding three corresponding pixels by more than the threshold $v_{(THE)}$, this is considered as belonging to a moving object and no change to the previously found applied intensity $v_{(a-i,j)}$ of that pixel $(i,j)_t$ is made. However, if it is less than the preset threshold, the applied value $v_{(a-i,j)}$ is the average intensity $v_{(2av.)}$ of the four corresponding pixels, i.e. $(i,j)_{(t)}+(i,j)_{(t-1)}+(i,j)_{(t-2)}+(i,j)_{(t-3)}$ all divided by 4. For practical purposes, the number of frames processed, i.e. preceding frames processed will normally be 3. If fewer frames are used, less accuracy or noise suppression is obtained. If a larger number of frames are used, then the noise suppression will be slightly higher.

Figure 3:
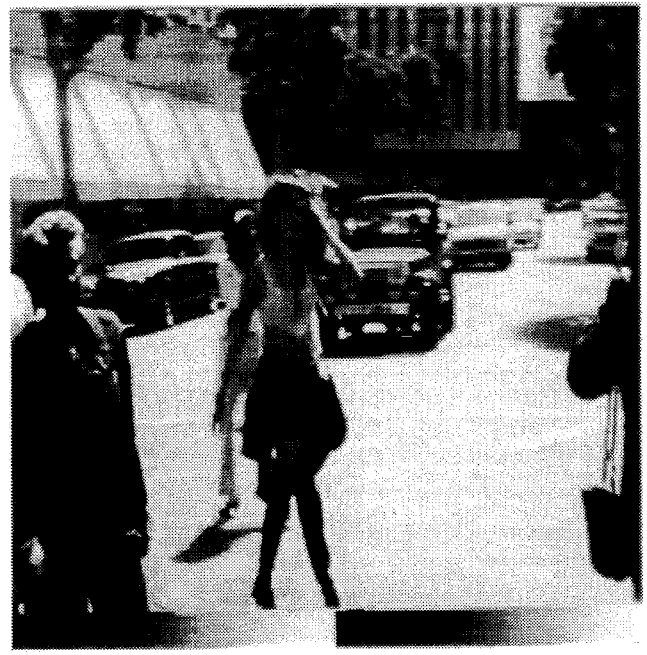
FIG. 3 shows a video frame with a composite triple beat impairment superimposed thereon.
Figure 4:
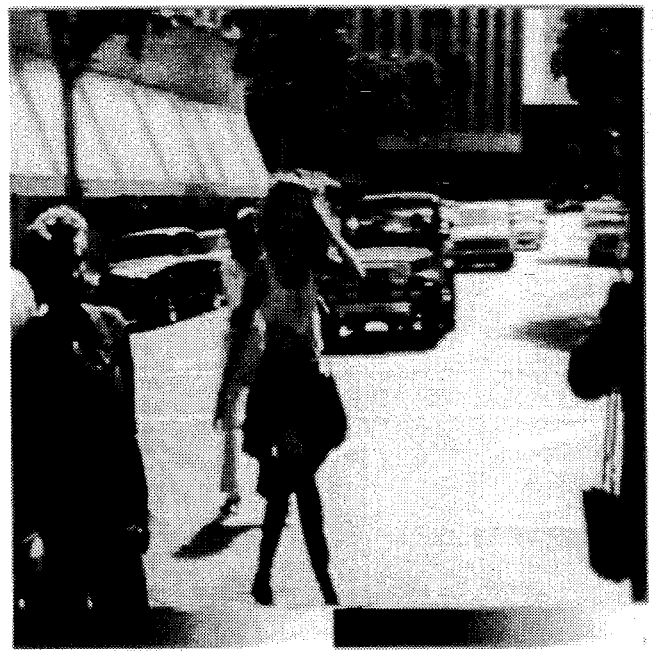
FIG. 4 is the same picture as FIG. 3 but corrected to remove the impairment using the present invention.

The effectiveness of the present invention is clearly demonstrated by the attached FIGS. 3 to 8 inclusive. In particular, FIG. 3 is a picture with CTB at about 35 decibels (DB) whereas FIG. 4 is the same picture after application of the present invention using spacial filters employing 5 pixels vertically (columns) and 5 pixels horizontal (rows); a threshold value $v_{(T)}=20$; 4 frame in the time filter and a second threshold value to determine motion of $v_{(THE)}=10$. It can be seen as the cleaned picture in FIG. 4 is significantly better than that in FIG. 3.

Figure 5:
FIG. 5 shows a video frame with a composite second order beat impairment superimposed thereon.
Figure 6:
FIG. 6 is the same picture as FIG. 5 but corrected to remove the impairment using the present invention.

A similar situation is shown by FIGS. 5 and 6 wherein in FIG. 5, the picture was deliberately distorted by (CSO) noise equal to 35 decibels and FIG. 6 shows the clean picture produced using the present invention.

Figure 7:
FIG. 7 shows a video frame with a thermal (snow) noise impairment superimposed thereon.
Figure 8:
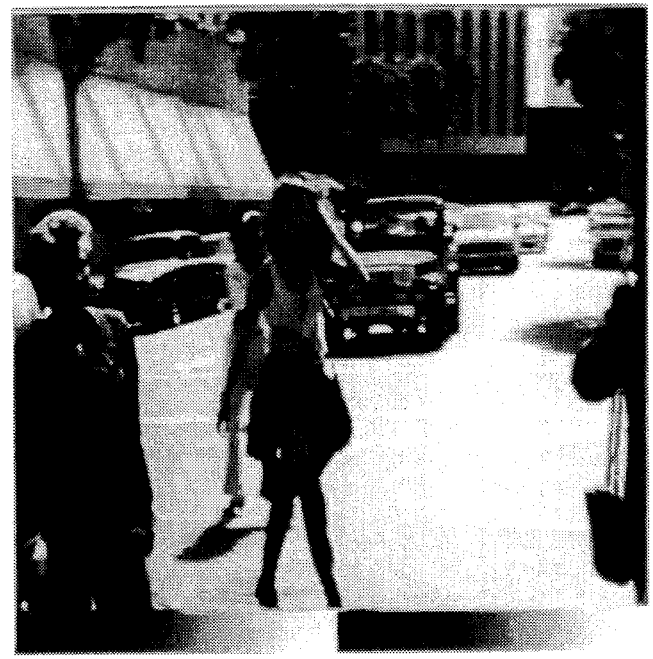
FIG. 8 is the same picture as FIG. 7 but corrected to remove the impairment using the present invention.

FIG. 7 shows a picture distorted by 35 DB of thermal noise and FIG. 8 shows the corrected picture.

Figure 9:
FIG. 9 shows a video frame with composite triple beat, composite second order beat and thermal noise impairments superimposed thereon.
Figure 10:
FIG. 10 is the same picture as FIG. 9 but corrected to remove the impairment using the present invention.

FIG. 9 shows a picture having imposed thereon CSO, CTB and thermal noise of 35 decibels and FIG. 10 shows the cleared picture using the present invention.

It will be apparent that in each case, the application of the present invention significantly improved the picture quality and accomplished the correction in real time i.e. short computation time and required relatively little and relatively inexpensive equipment compared with the normal computing time and hardware to obtain the equivalent degree of cleanliness in the resultant picture.

The amount of hardware required is particularly small when the present invention is applied to the situation where there is A/D processing hardware and frame storage already available on cite e.g. in a digital video convertor.

The above description has dealt with grey scale values for the pixels which is sometimes associated with black and white pictures, it may equally well be applied to color pictures eg. by application to each component of the color signal as required.

Having described the invention, modifications will be evident to those skilled in the art without departing the spirit of the invention as defined in the appended claims.

We claim:

1. A system for reducing impairments in real time from a television transmission comprising digitizing frames to produce digitized frames containing pixels each having their respective original grey scale intensity value (v) digitized to a corresponding digitize grey scale value ($v_{(i,j)}$), processing said digitized frame for each pixel for which said impairments are to be reduced by applying spatial filter to a block of said pixels containing said pixel ($P_{(i,j)}$) then being processed by determining the pixel ($P_{max}$) in said block having the maximum grey scale intensity value ($v_{(max)}$) and the pixel ($P_{min}$) in said block having the minimum grey scale intensity value ($v_{(min)}$) and comparing $v_{(max)}$ minus $v_{(min)}$ to a threshold value ($v_{(T)}$), if $v_{(max)} - v_{(min)} > v_{(T)}$ a resultant value $v_{(R-i,j)}$ for the pixel $P_{(i,j)}$ being processed is said value ($v_{(i,j)}$) for the pixel being processed and if $v_{(max)} - v_{(min)} \not> v_{(T)}$ the resultant value $v_{(R-i,j)}$ for the pixel $P_{(i,j)}$ being processed is determined by finding a weighted average intensity value $v_{(av.)}$ of the pixels in the group after applying a minimum weighting value ($W_{(min)}$) to $v_{(max)}$ and to $v_{(min)}$ and using the weighted average value $v_{(av.)}$ to define the resultant intensity value $v_{(R-i,j)}$ for the pixel $P_{(i,j)}$ being processed, and reconstructing said frames to provide corrected frames using applied values $v_{(a-i,j)}$ derived from said resultant value $v_{(R-i,j)}$ as grey scale value for its respective pixel in said reconstructed frame.

2. A system as defined in claim 1 wherein said minimum weighting value $W_{(min)}$ is zero (0).

3. A system as defined in claim 1 wherein said block is defined by an odd number of adjacent pixels of between three to seven pixels along a row of pixels.

4. A system as defined in claim 1 wherein said block is defined by an odd number of adjacent pixels of between three and seven pixels along a column of pixels.

5. A system as defined in claim 1 wherein said block for each said pixel being processed comprises a first block composed of an odd number of between three and seven of adjacent said pixels along a row of said pixels and a second block composed of an odd number of between three and seven of adjacent pixels along a column of said pixels and wherein said first blocks are first processed to determine said resultant values $v_{(R-i,j)}$ of pixels and said resultant values $v_{(R-i,j)}$ is used as grey scale values for their respective said pixels when said second blocks are subjected to said processing to determine a second weighted average $v_{(2av.)}$ and said second weighted average $v_{(2av.)}$ is used as said applied value of intensity $v_{(a-i,j)}$ of the pixel being processed or said resultant value $v_{R-i,j}$ is used as said applied value $v_{(a-i,j)}$ if $v_{(max)} - v_{(min)} > v_{(T)}$.

6. A system as defined in claim 1 wherein said minimum weighting value is zero (0) and the remaining pixels in said block are given equal weighting.

7. A system as defined in claim 3 wherein said minimum weighting value is zero (0) and the remaining pixels in said block are given equal weighting.

8. A system as defined in claim 4 wherein said minimum weighting value is zero (0) and the remaining pixels in said block are given equal weighting.

9. A system as defined in claim 5 wherein said minimum weighting value is zero (0) and the remaining pixels in said block are given equal weighting.

10. A system as defined in claim 5 further comprising applying said processing to a plurality of said digitized frames in succession to provide a group of said frames, determining if movement is depicted in the pixel being processed between corresponding pixels in said frames in said group, if movement is detected, said previously found applied value $v_{(a-i,j)}$ of the pixel in the frame being processed will be retained and used to reconstruct said corrected frame, and if movement is not detected, a mean value $v_{(mean)}$ of said previously found values $v_{(a-i,j)}$ of corresponding pixels in said frames in said group will be used as the applied value $v_{(a-i,j)}$ to reconstruct said corrected frame.

11. A system as defined in claim 9 further comprising applying said processing to a plurality of said digitized frames in succession to provide a group of said frames, determining if movement is depicted in the pixel being processed between corresponding pixels in said frames in said group, if movement is detected, said previously found applied value $v_{(a-i,j)}$ of the pixel in the frame being processed will be retained and used to reconstruct said corrected frame, and if movement is not detected, a mean value $v_{(mean)}$ of said previously found values $v_{(a-i,j)}$ of corresponding pixels in said frames in said group will be used as the applied value $v_{(a-i,j)}$ to reconstruct said corrected frame.

12. A system as defined in claim 10 wherein said number of frames in each said group is four.

13. A system as defined in claim 11 wherein said number of frames in each said group is four.

14. A system as defined in claim 1 further comprising applying said processing to a plurality of said digitized frames in succession to provide a group of said frames, determining if movement is depicted in the pixel being processed between corresponding pixels in said frames in said group, if movement is detected, said previously found applied value $v_{(a-i,j)}$ of the pixel in the frame being processed will be retained and used to reconstruct said corrected frame, and if movement is not detected, a mean value $v_{(mean)}$ of said previously found values $v_{(a-i,j)}$ of corresponding pixels in said frames in said group will be used as the applied value $v_{(a-i,j)}$ to reconstruct said corrected frame.

15. A system as defined in claim 14 wherein said number of frames in each said group is four.

* * * * *